United States Patent [19]
Yoshino et al.

[11] Patent Number: 5,246,278
[45] Date of Patent: Sep. 21, 1993

[54] WHEEL SLIP RATIO CORRECTION APPARATUS

[75] Inventors: Masato Yoshino; Yoshio Katayama, both of Itami, Japan

[73] Assignee: Sumitomo Electric Industries, Inc., Osaka, Japan

[21] Appl. No.: 757,483

[22] Filed: Sep. 10, 1991

[30] Foreign Application Priority Data

Sep. 17, 1990 [JP] Japan .................................. 2-248292

[51] Int. Cl.$^5$ ................................................ B60T 8/82
[52] U.S. Cl. ...................................... 303/96; 303/103; 303/111; 364/426.02
[58] Field of Search ................ 303/100, 103, 109, 95, 303/96, 102, 111; 180/197; 364/426.02, 426.03; 188/181 C, 181 A

[56] References Cited

U.S. PATENT DOCUMENTS

| | | | |
|---|---|---|---|
| 3,894,773 | 7/1975 | Cleveland et al. | 303/100 |
| 4,583,173 | 4/1986 | Odlen et al. | 180/197 X |
| 4,762,375 | 8/1988 | Maki et al. | 303/96 |
| 4,787,682 | 11/1988 | Mato | 303/103 X |
| 5,005,916 | 4/1991 | Fujioka et al. | 303/111 X |
| 5,097,921 | 3/1992 | Tezuka | 180/197 |
| 5,119,298 | 6/1992 | Naito | 180/197 X |

*Primary Examiner*—Robert J. Oberleitner
*Assistant Examiner*—Lee W. Young
*Attorney, Agent, or Firm*—Sandler Greenblum & Bernstein

[57] ABSTRACT

A wheel slip ratio correction apparatus is disclosed which includes a calculation unit for calculating a slip ratio of each wheel when the brakes are not applied to either a front wheel or a rear wheel of a mobile vehicle such as a motorcycle. The calculation unit calculates a difference between a front wheel slip ratio and a rear wheel slip ratio, and changes in the slip ratio difference, which occur within a predetermined time period, are monitored by detecting if the slip ratio difference is stable and is within a predetermined range for a predetermined period of time. If the slip ratio difference is stable and is within the predetermined range for the predetermined period of time, a correction value, dependent upon the slip ratio difference, is subtracted from the greater of the front wheel slip ratio and rear wheel slip ratio so that any undesirable difference between the front and rear wheel slip ratios may be eliminated.

33 Claims, 12 Drawing Sheets

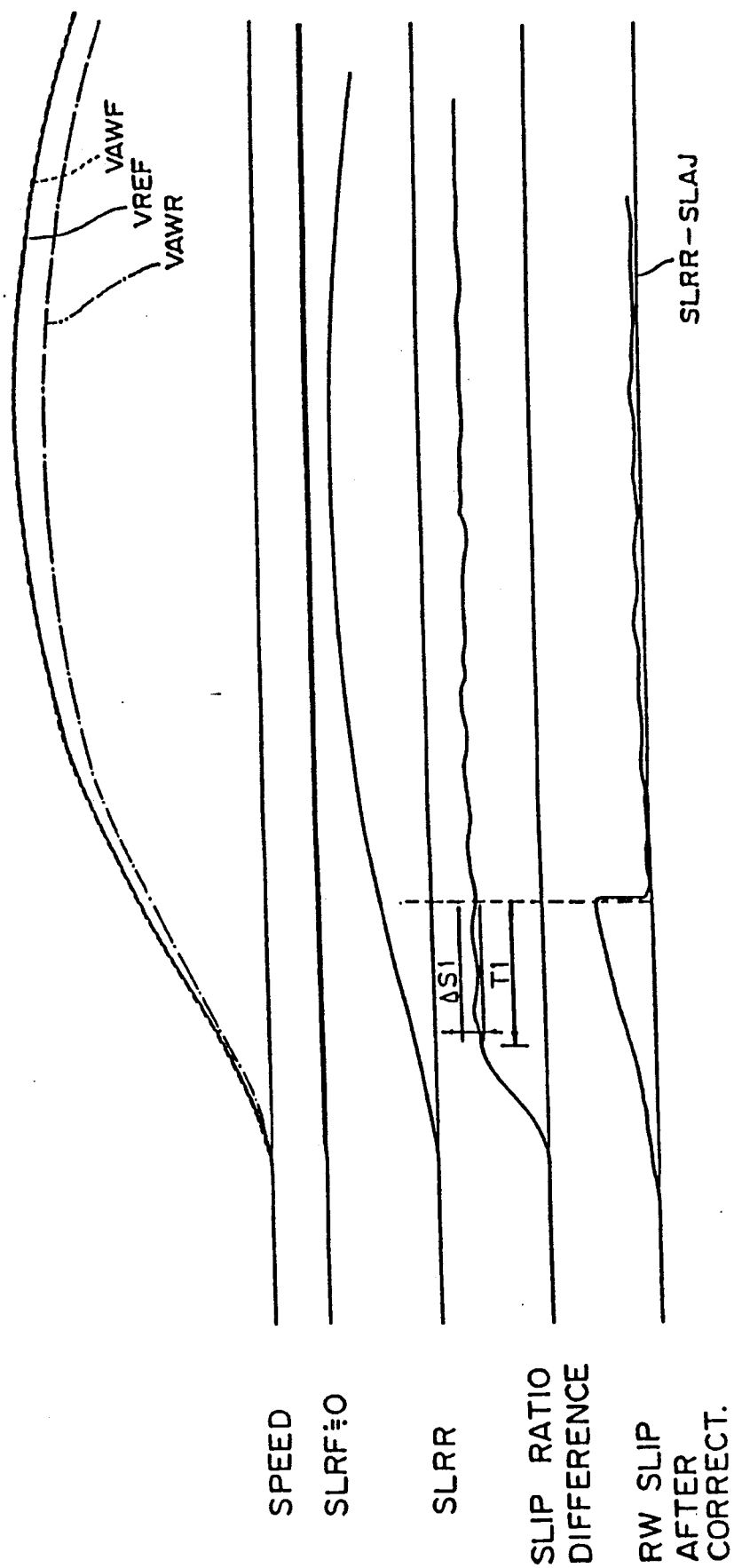

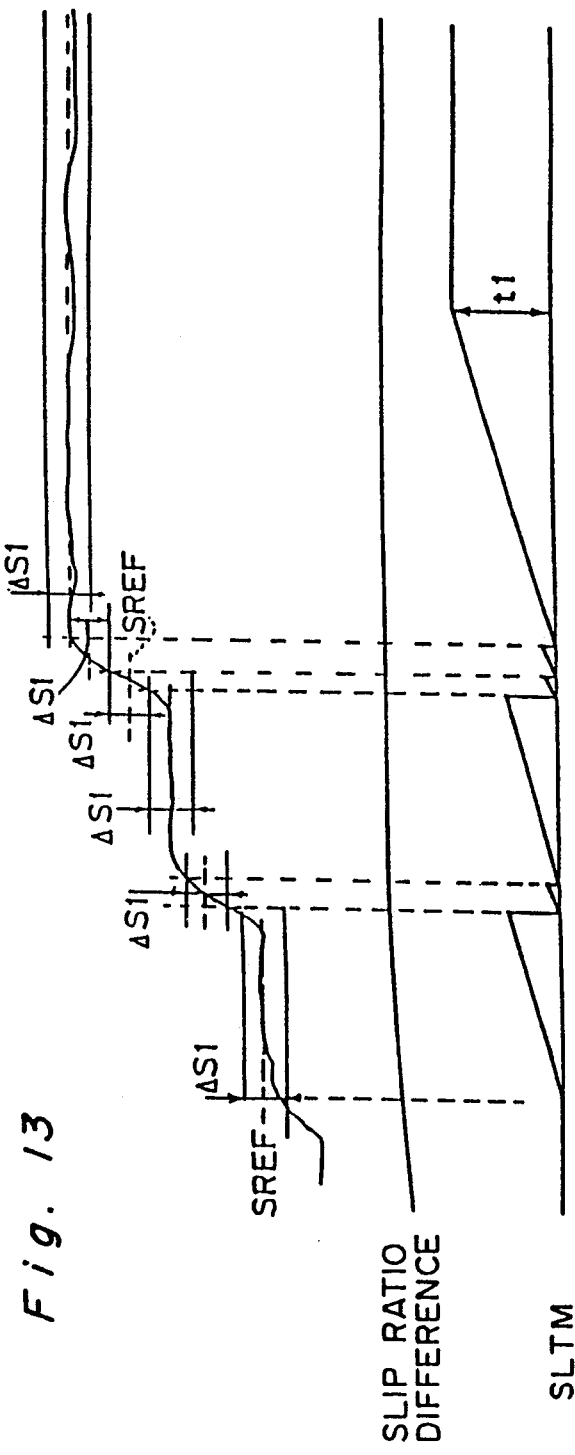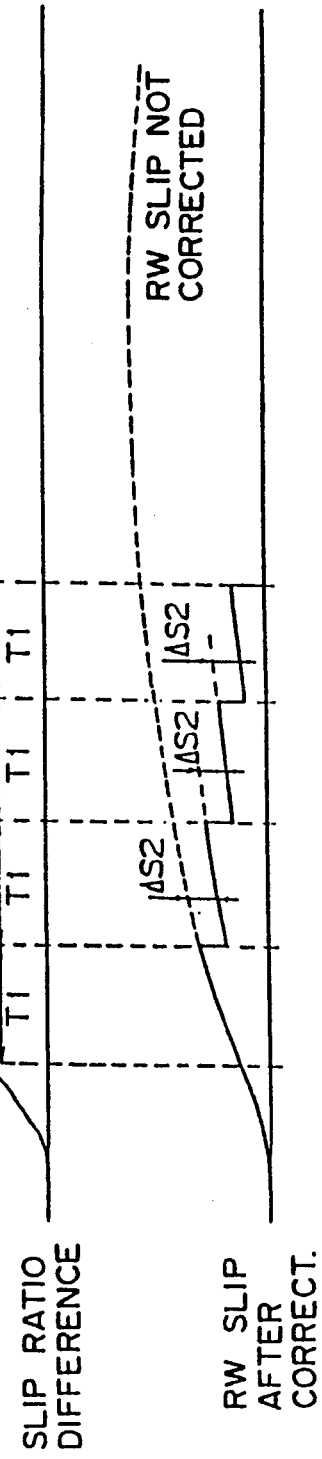

WHEEL SLIP RATIO CORRECTION APPARATUS

BACKGROUND OF THE INVENTION

1. Field of the Invention

The present invention relates to a wheel slip ratio correction apparatus for use in antilock brake systems for motorcycles.

2. Description of the Prior Art

In general, the vehicle speed used in an antilock brake system on a motorcycle is an estimated value. This estimated vehicle speed is calculated based on a signal output from wheel speed sensors which are mounted on each wheel, and detect the rotational velocity of each wheel. In other words, the estimated vehicle speed is calculated based on the front and rear wheel speeds.

However, when one or more of the tire diameters differs from the design value, such as when the two tires mounted on the motorcycle have different wheel diameters or when the air pressure in one tire differs from that of another, an apparent speed difference occurs in the speed of the front and rear wheels even when the vehicle is travelling at a constant rate.

The difference between the estimated vehicle speed and the wheel speed may be recognized by an antilock brake control system to indicate slipping of the tires. Thus, the control system determines that slipping occurs due to the difference in tire diameters even though the tires are in fact not slipping. The antilock brake control system therefore operates to cancel out the apparent slipping, causing the brake pressure to be softened during normal driving and creating a potentially dangerous situation.

SUMMARY OF THE INVENTION

The present invention has been developed to overcome the above-described disadvantage.

It is accordingly an object of the present invention to provide a wheel slip ratio correction apparatus for motorcycles which can eliminate false detection of slipping.

In accomplishing this and other objects, a wheel slip ratio correction apparatus according to the present invention includes slip ratio difference detection means for obtaining a slip ratio of each wheel when brakes are not applied to either a front wheel or a rear wheel in order to obtain a difference between a front wheel slip ratio and a rear wheel slip ratio.

The apparatus further includes slip ratio difference monitoring means for monitoring a change with time in the slip ratio difference by detecting if the slip ratio difference is stable for a predetermined period of time and is within a predetermined range of change.

The apparatus also includes correction value setting means for setting a correction value dependent upon the slip ratio difference and slip ratio correction means for subtracting the correction value from the greater of the front wheel slip ratio and rear wheel slip ratio to eliminate any difference between the front and rear wheel slip ratios when it is detected by the slip ratio difference monitoring means that the change in the slip ratio difference is stable for the predetermined period of time and is within a predetermined range of change.

In the above-described construction, if it is detected by the slip ratio difference detection means that a difference has occurred between the slip ratios of the front and rear wheels when the brakes are not applied, the slip ratio difference monitoring means successively monitors the difference in the slip ratios for a predetermined period of time. If the difference in the slip ratios is stable and fairly constant, then this difference is determined to be not a product of the tires actually slipping but of a difference in the diameters of the tires. Furthermore, a value of the greater slip ratio is corrected to that of the smaller slip ratio by the slip ratio correction means.

BRIEF DESCRIPTION OF THE DRAWINGS

This and other objects and features of the present invention will become more apparent from the following description taken in conjunction with the preferred embodiment thereof with reference to the accompanying drawings, throughout which like parts are designated by like reference numerals, and wherein:

FIGS. 3, 4a, 4b, 5, 6, 7, 8, 9, 10, 1nd 11 are flow charts describing in detail the control steps executed the calculation unit; and FIGS. 12, 13, and 14 are graphs used to describe the procedure whereby the slip ratio is corrected.

DETAILED DESCRIPTION OF THE PREFERRED EMBODIMENTS

Figure 1:
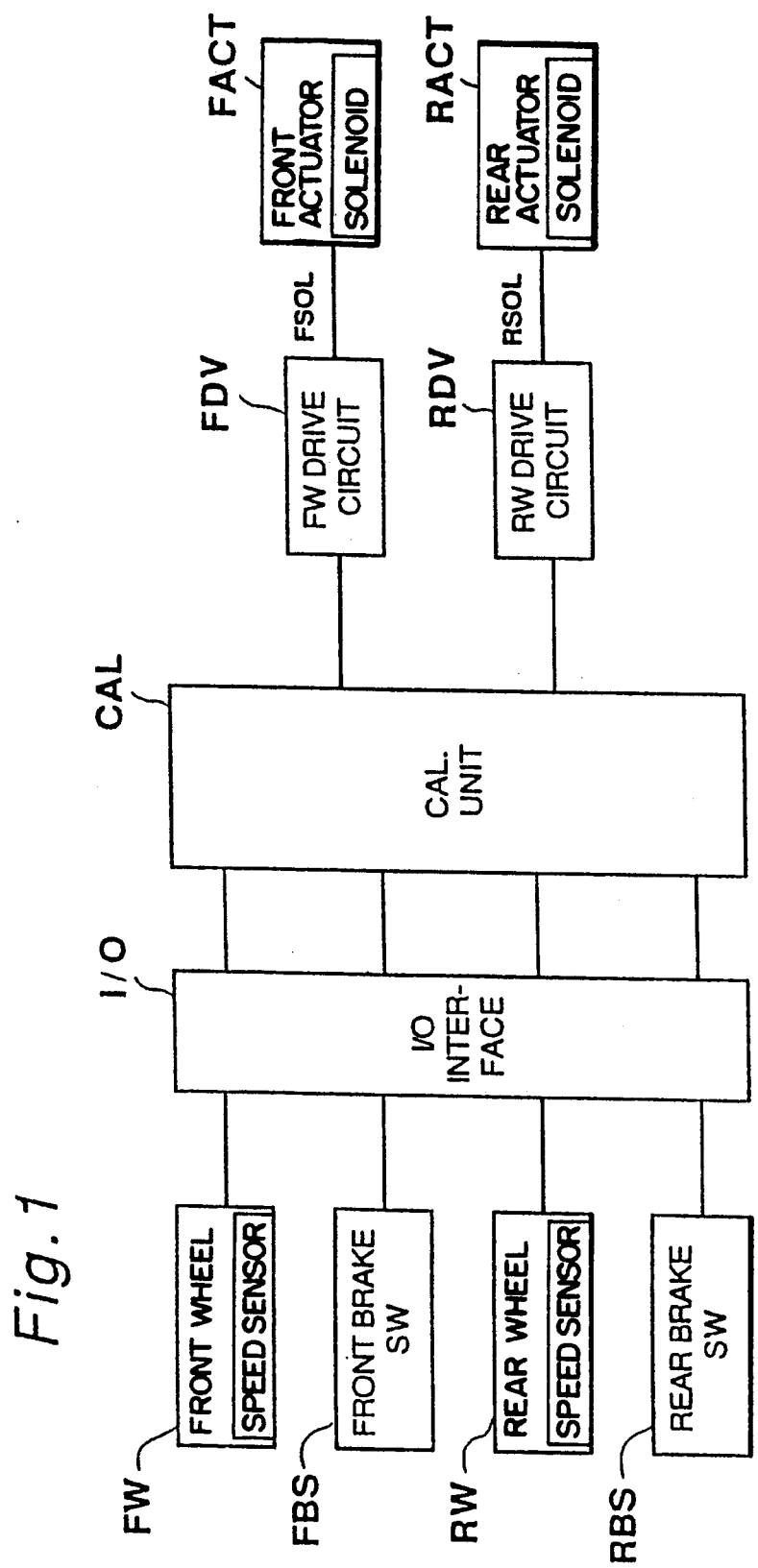
FIG. 1 is a block diagram of an antilock brake control system comprising a slip ratio correction apparatus for motorcycles according to the present invention.

FIG. 1 is a block diagram of an antilock brake control system equipped with a slip ratio correction apparatus according to the present invention. As shown in the figure, this system comprises a front wheel brake switch FBS at the front wheel FW and a rear wheel brake switch RBS at the rear wheel RW, an input interface I/O, and a calculation unit CAL As shown in FIG. 1, the front wheel FW and the rear wheel RW may both include wheel speed sensors, which output a signal proportional to the rotational speed of the wheel. The input interface I/O outputs signals corresponding to the rotational speed of the front and rear wheels and signals corresponding to the on/off state of the front and rear wheel brake switches. The output signals from the input interface I/O are input to the calculation unit CAL, which performs the calculations required for slip ratio correction and antilock brake control for the front and rear wheels. The computed result for front wheel antilock brake control is applied to a front wheel drive circuit FDV, which outputs a front wheel solenoid output FSOL to drive a front wheel actuator FACT including a solenoid. Through a similar operation, the computed result for rear wheel antilock brake control is applied to a rear wheel drive circuit RDV which outputs a rear wheel solenoid output RSOL to a rear wheel actuator RACT. The front and rear wheel actuators FACT and RACT increase or decrease the respective brake hydraulic pressure for independent antilock brake control of the front and rear wheels.

Figure 2A:
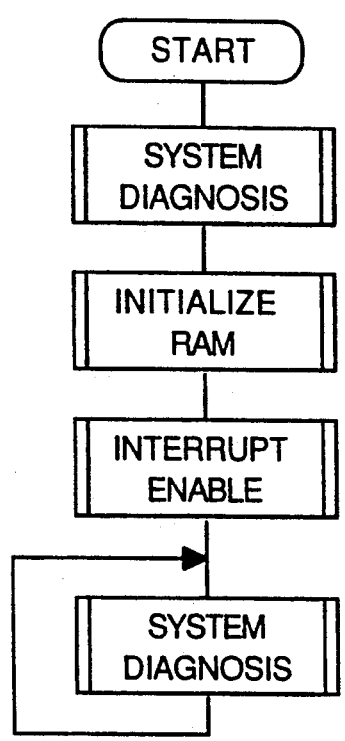
FIGS. 2a, 2b, and 2c are flow charts outlining the control steps executed by a calculation unit.
Figure 2C:
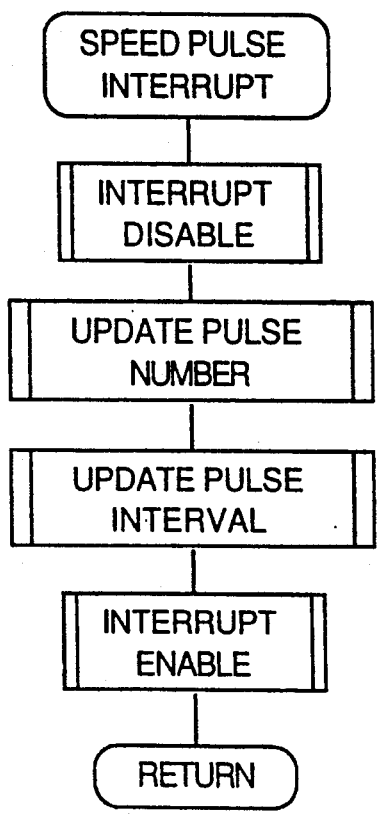
Figure 2B:
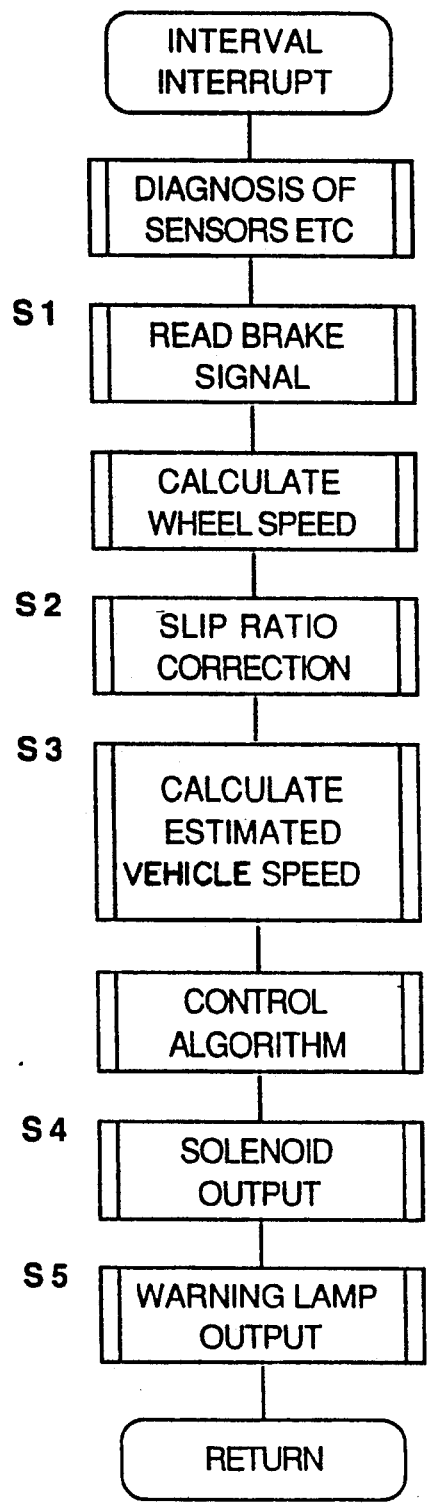

Flow charts shown in FIGS. 2a, 2b, and 2c summarize control steps executed by the calculation unit CAL.

The basic control routine is shown in FIG. 2a with the first step being a diagnostic test run when the system is started. A RAM is then initialized and an interrupt enable signal is output. Thereafter the system diagnostics block is looped through continuously.

FIG. 2b shows an interrupt process executed at intervals during the system diagnostics block shown in the last step in FIG. 2a. The interval interrupt process comprises plural sub-routines, the first of which is a diagnostics test of the system solenoids, sensors, and other components. This is followed by a brake operation signal read operation in a sub-routine S1. A sub-routine to calculate the wheel speed and deceleration is then run, followed by a sub-routine S2 to calculate the slip ratio correction according to the present invention. The estimated vehicle speed is then calculated in a sub-routine S3, followed by a sub-routine for the control algorithm. Thereafter a solenoid output sub-routine S4 and a warning lamp output sub-routine S5 are repeated.

FIG. 2c shows a wheel speed pulse interrupt routine by which a pulse dependent upon the rotational speed of the front and rear wheels is determined. This wheel speed pulse interrupt routine includes sub-routines to disable an interrupt, update the pulse number, update the pulse interval, and re-enable an interrupt. Because the wheel speed pulse interrupt routine starts by blocking any interrupt operation, the interval interrupt routine does not start even when the time for the interval interrupt routine has come, thereby enabling the wheel speed pulse interrupt routine to be run with precedence to update the wheel speed pulse number and the pulse interval. Thereafter the interrupt is re-enabled and the interval interrupt routine is executed.

Figure 3:
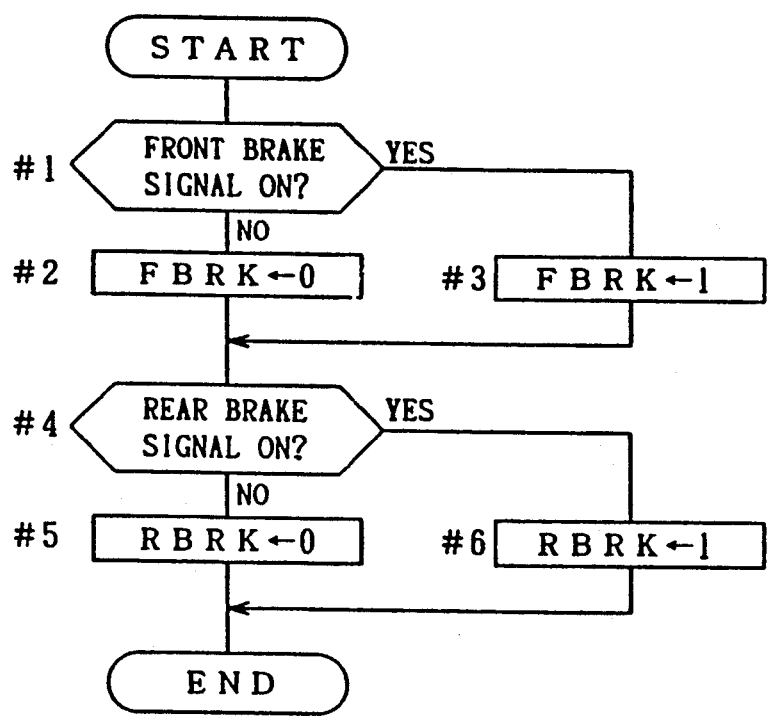

FIG. 3 is a flow chart showing the steps in the brake operation signal read sub-routine S1 shown in FIG. 2b.

At Step #1 it is determined whether a front brake operation signal is ON, i.e., whether the front wheel brake switch FBS shown in FIG. 1 is ON or OFF. If the front brake is not applied and the front brake operation signal is therefore OFF, the procedure advances to Step #2 and a front brake flag FBRK is reset to 0. However, if the front brake is applied and the front brake operation signal is therefore ON, the procedure advances to Step #3 and the front brake flag FBRK is set to 1.

Steps #4, #5, and #6 are the same steps applied to a rear brake operation signal such that if the rear brake operation signal is ON, i.e., the rear brake is applied, a rear brake flag RBRK is set to 1 (Step #6). In contrast, if the rear brake operation signal is OFF, the same flag RBRK is reset to 0 (Step #5).

Figure 4A:
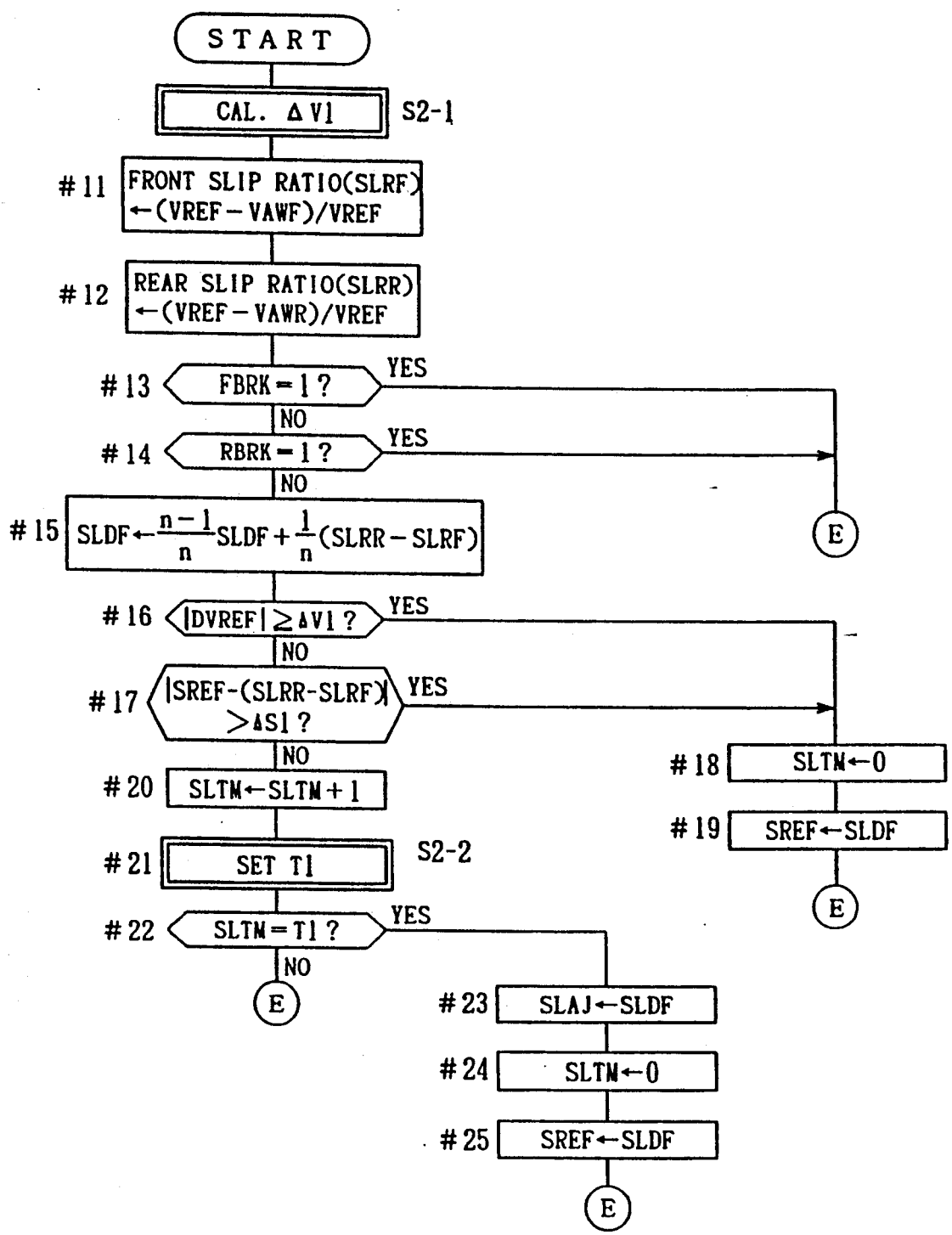
Figure 4B:
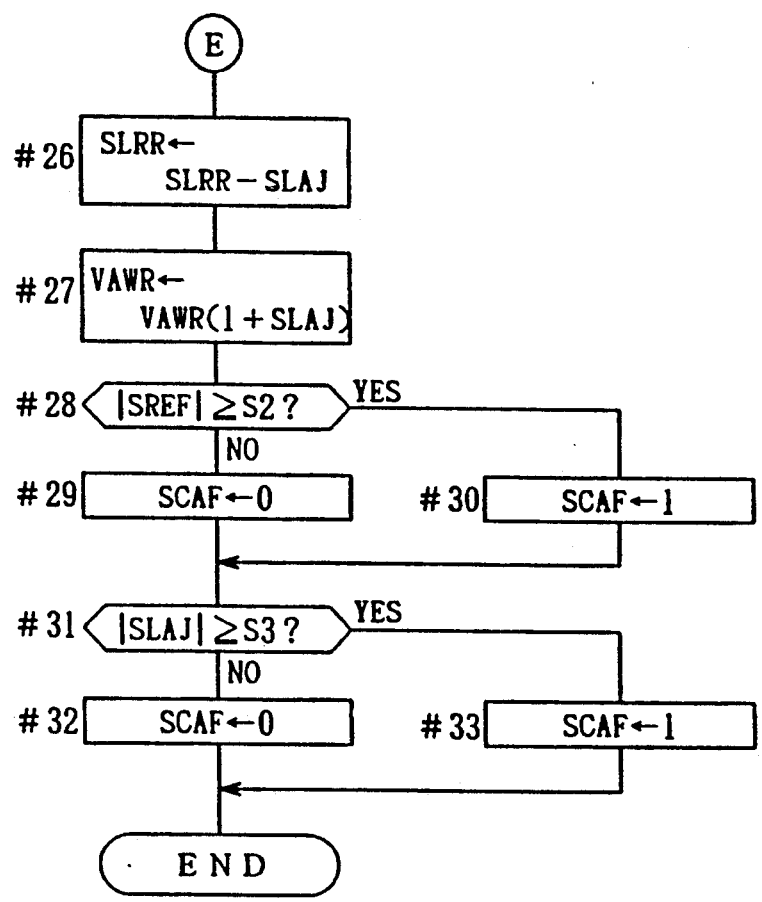
Figure 8:
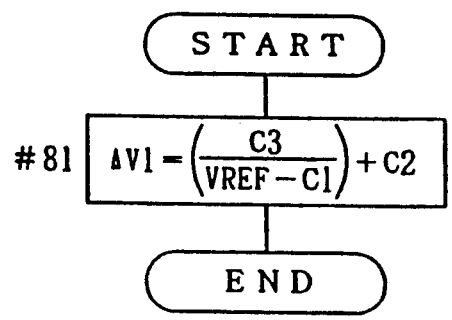

FIG. 4a and FIG. 4b are flow charts showing the specific steps in the slip ratio correction sub-routine S2 shown in FIG. 2b. This sub-routine starts by calculating a fixed amount of change $\Delta V1$ in the speed in a sub-routine S2-1. The steps required for this calculation are shown in FIG. 8. The fixed amount of change $\Delta V1$ in the speed is 20 calculated from the equation $$\Delta V1 = \frac{C3}{VREF - C1} + C2$$

where C1, C2, and C3 are constants. It is to be noted that the formula applied to calculate the fixed amount of change $\Delta V1$ shall not be limited to the above and various other equations may also be applied.

Returning to FIG. 4a, at step #11, a front wheel speed VAWF is subtracted from an estimated vehicle speed VREF, the difference is divided by the estimated vehicle speed VREF, and the result is defined as a front wheel slip ratio SLRF. Likewise at Step #12, a rear wheel speed VAWR is subtracted from an estimated vehicle speed VREF, the difference is divided by the estimated vehicle speed VREF, and the result is defined as a rear wheel slip ratio SLRR. The slip ratio is thus defined by the equation:

$$\text{Slip ratio} = \frac{\text{estimated vehicle speed} - \text{wheel speed}}{\text{estimated vehicle speed}}$$

At Steps #13 and #14 it is determined whether the front brake flag FBRK and the rear brake flag RBRK, respectively, are set to 1. If either of the flags is set to 1, a correction routine shown in FIG. 4b is executed. In contrast, if both flags are set to 0, the procedure advances to Step #15 and a filter equiation is processed.

Specifically, a filter value is calculated at Step #15 by multiplying the difference between the front wheel slip ratio SLRF and the rear wheel slip ratio SLRR by (1/n), and adding to this product the product of the slip ratio SLDF calculated in the previous cycle multiplied by [(n-1)/n], thus evaluating the equation $$SLDF = \frac{n-1}{n} SLDF + \frac{1}{n} (SLRR - SLRF)$$

and defining the calculated result as the new slip ratio difference filter value SLDF. It is to be noted that the value n may be a constant of any desired value.

At Step #16, it is determined whether the absolute value of the amount of change in an estimated vehicle speed DVREF is within the predetermined range of estimated vehicle speed change $\Delta V1$ calculated in the sub-routine S2-1 as described above. If it is outside this range, the procedure advances to Step #18, and if it is within the range, the procedure advances to Step #17. At Step #17 it is further determined if the absolute value of the difference between a slip ratio reference value SREF and the difference between the front and rear wheel slip ratios (SLRR−SLRF) is greater than a predetermined low value $\Delta S1$. If the former is greater than the latter, the procedure advances to Step #18. In contrast, if the former is smaller than the latter, the procedure advances to Step #20. In other words, if a YES is returned by either Step #16 or Step #17, the procedure advances to Step #18, but if a NO is returned by either Step #16 or #17, the procedure advances to Step #20. It is to be noted that the slip ratio difference filter value SLDF may also be substituted for the difference between the front and rear wheel slip ratios (SLRR−SLRF) at Step #17.

At Step #18 a timer SLTM is reset, and at Step #19 the slip ratio difference filter value SLDF calculated at Step #15 is set as the slip ratio reference value SREF. The correction routine shown in the flow chart of FIG. 4b is then executed.

At Step #20 the timer SLTM is incremented one, and at Step #21 a target count T1 of the timer is set. A method for setting the target count T1 is shown in a sub-routine S2-2 shown in FIG. 9.

Figure 9:
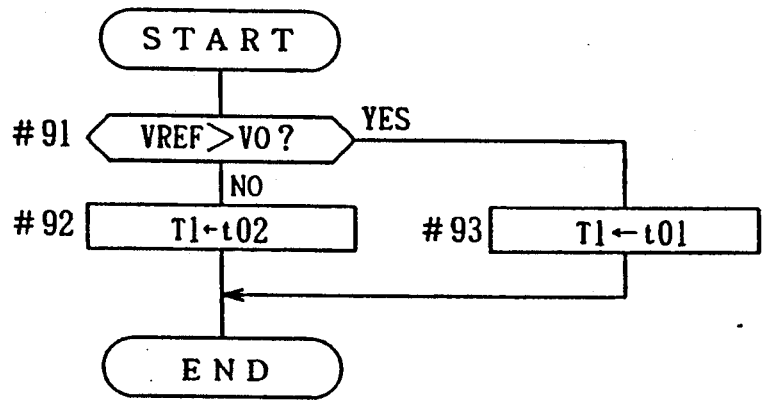

In FIG. 9 it is determined whether the estimated vehicle speed VREF is greater than a predetermined speed V0 at Step #91. If the estimated vehicle speed VREF is greater than the predetermined speed V0, the value t01 is set as the target count T1 at Step #93. In contrast, if the estimated vehicle speed VREF is less than the predetermined speed V0, then a value t02 is set as the target count T1 at Step #92. It is to be noted that the values V0, t01, and t02 are each constants where t01 is greater than t02.

Returning to FIG. 4b, it is determined at Step #22 whether the count of the timer SLTM is equal to the target count T1. If the count has still not reached the target value, the procedure advances to the correction routine shown in FIG. 4b, but if the timer SLTM count has reached the target count T1, the procedure advances to Step #23 where the slip ratio difference filter value SLDF obtained at Step #15 is set as a slip ratio correction value SLAJ. Then at Step #24 the timer SLTM is reset, and the slip ratio difference filter value SLDF is set as the slip ratio reference value SREF at Step #25. From Step #25 the procedure also advances to the correction routine shown in FIG. 4b.

At Step #26 in FIG. 4b, the rear wheel slip ratio SLRR obtained in the current cycle is reduced by the slip ratio correction value SLAJ, and the resulting difference is defined as the corrected rear wheel slip ratio SLRR. At Step #27, the rear wheel speed VAWR obtained in the current cycle is multiplied by the value (slip ratio correction value SLAJ +1), and the resulting product is defined as the corrected rear wheel speed VAWR. Thus, the rear wheel speed is set to a value closer to the actual vehicle speed, and an estimated speed closer to the actual vehicle speed is obtained.

The sequence of Steps #28, 29, and 30 determines whether to set an alarm flag SCAF based on the currently set slip ratio reference value SREF. If the absolute value of the slip ratio reference value SREF is greater than a second predetermined value S2, the alarm flag SCAF is set to 1 at Step #30 to prepare to emit the alarm. In contrast, trast, if said absolute value is smaller than S2, the alarm flag SCAF is reset at Step #29.

Similarly, the sequence of Steps #31, 32, and 33 determines whether to set the alarm flag SCAF based on the slip ratio correction value SLAJ. If the absolute value of the slip ratio correction value SLAJ is greater than a third predetermined value S3, the alarm flag SCAF is set to 1 at Step #33, but if said absolute value is smaller than S3, the alarm flag SCAF is reset at Step #32.

Figure 5:
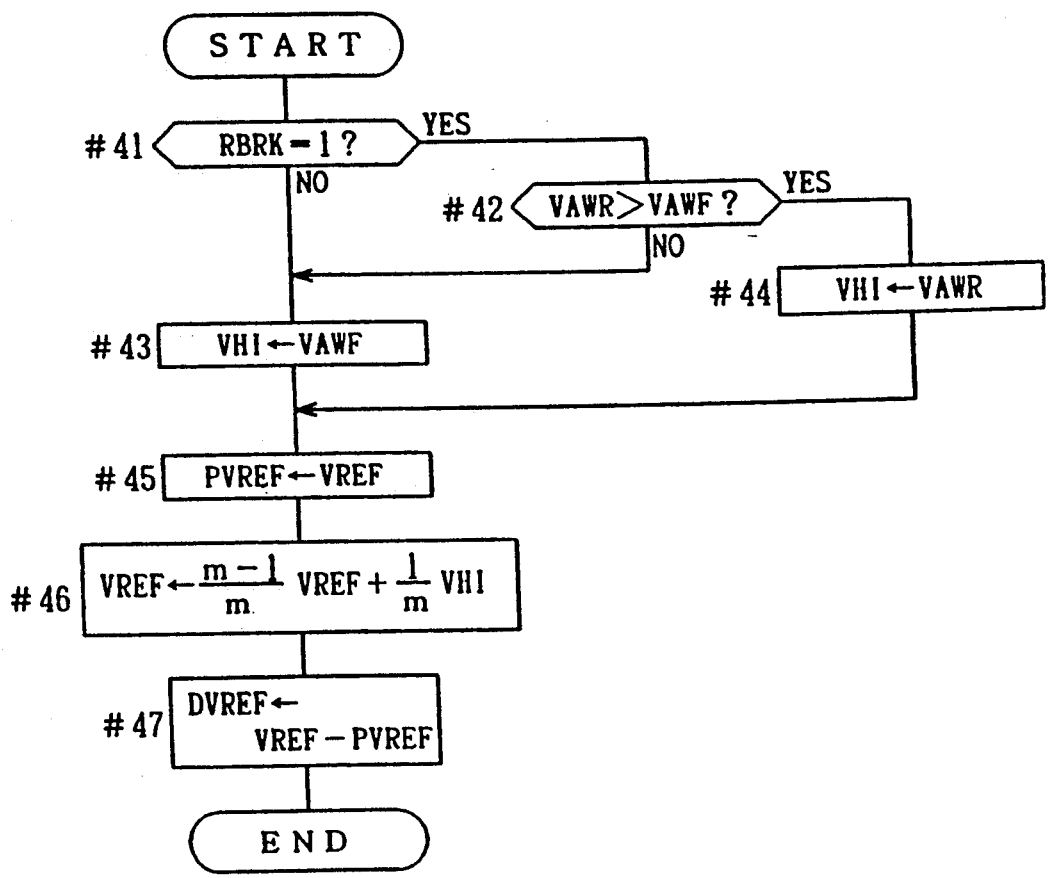

FIG. 5 is a flow chart for the sub-routine S3 to calculate the estimated vehicle speed. At Step #41, it is determined whether a rear brake flag RBRK is set to 1. If it is, the procedure advances to Step #42 where the rear wheel speed VAWR and the front wheel speed VAWF are compared. However, if the flag RBRK is reset, the procedure advances to Step #43. If at Step #42 the rear wheel speed VAWR is greater, the rear wheel speed VAWR is stored to a register VHI, but if the front wheel speed VAWF is greater, then the front wheel speed VAWF is stored to the register VHI at Step #43. At Step #45 the estimated vehicle speed VREF is stored to a register PVREF comprised to store the estimated vehicle speeds VREF calculated in the current and previous cycles. Thus at the next Step #46 an estimated vehicle speed even closer to the actual vehicle speed is calculated by the filter equation $$VREF = \frac{m-1}{m} VREF + \frac{1}{m} VHI.$$

At Step #47 the difference between estimated vehicle speed VREF obtained in the current cycle and the estimated vehicle speed PVREF obtained in the previous cycle is obtained to compute a change DVREF in the estimated vehicle speed.

Figure 6:
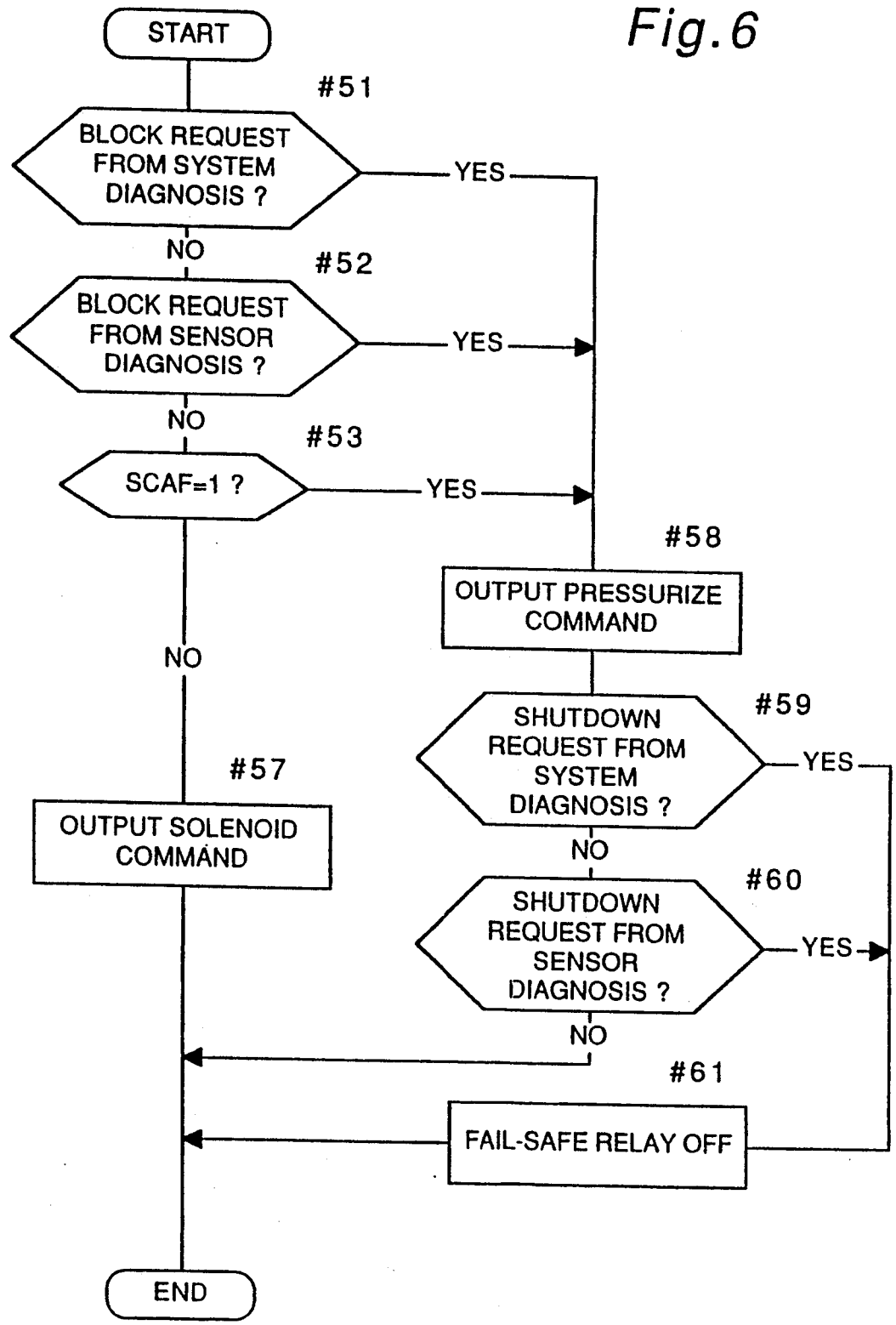

FIG. 6 is a flow chart for the solenoid output sub-routine S4. At Step #51 it is determined whether a solenoid operation block request is output from the system diagnostics. At Step #52 it is determined whether the solenoid operation block request is output from the solenoid/sensor diagnostics. At Step #53 it is determined whether the alarm flag SCAF is set. If an YES is returned by any of Steps #51, 52, or 53, the procedure advances to Step #58 whereby a pressurize (OFF) command is output to the front and rear wheel solenoids. In contrast, if a NO is returned by each of Steps #51, 52, and 53, the procedure advances to Step #57. It is to be noted that the effect of Step #58 is to block antilock brake control for both the front and rear wheels.

At Step #57 a solenoid command determined by a control algorithm is output and antilock brake control is enabled.

Furthermore, if it is determined at Steps #59 and 60 that a system shutdown request had been output from the system or solenoid/sensor diagnostics procedures, respectively, the procedure advances to Step #61 and a fail-safe relay is turned OFF.

Figure 7:
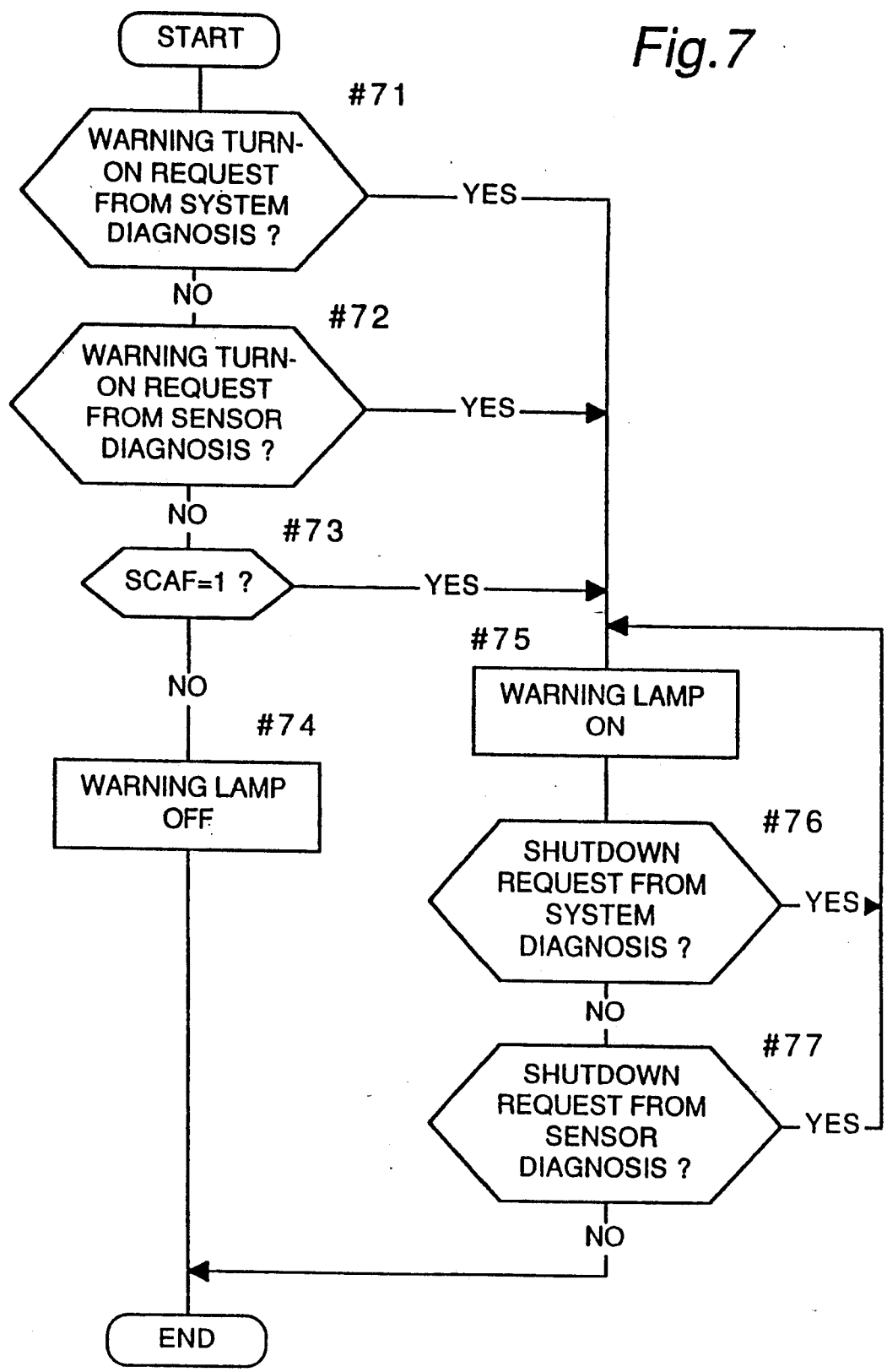

FIG. 7 shows a flow chart for the warning indicator output sub-routine S5. As in Steps #51, 52, and 53 in FIG. 6, if a warning indicator turn-on request is output from the system diagnostics or the solenoid/sensor diagnostics or the alarm flag SCAF is set to 1, the procedure advances to Step #75 and the warning indicator is turned on. However, if a turn-on request is not present and the alarm flag SCAF is reset to 0, the warning lamp is controlled at Step #74 to turn off. If there is a system shutdown request detected at either Step #76 or 77, the procedure returns to Step #75 and the warning indicator is held in the ON state. This sequence terminates if there is no system shutdown request detected.

Figure 10:
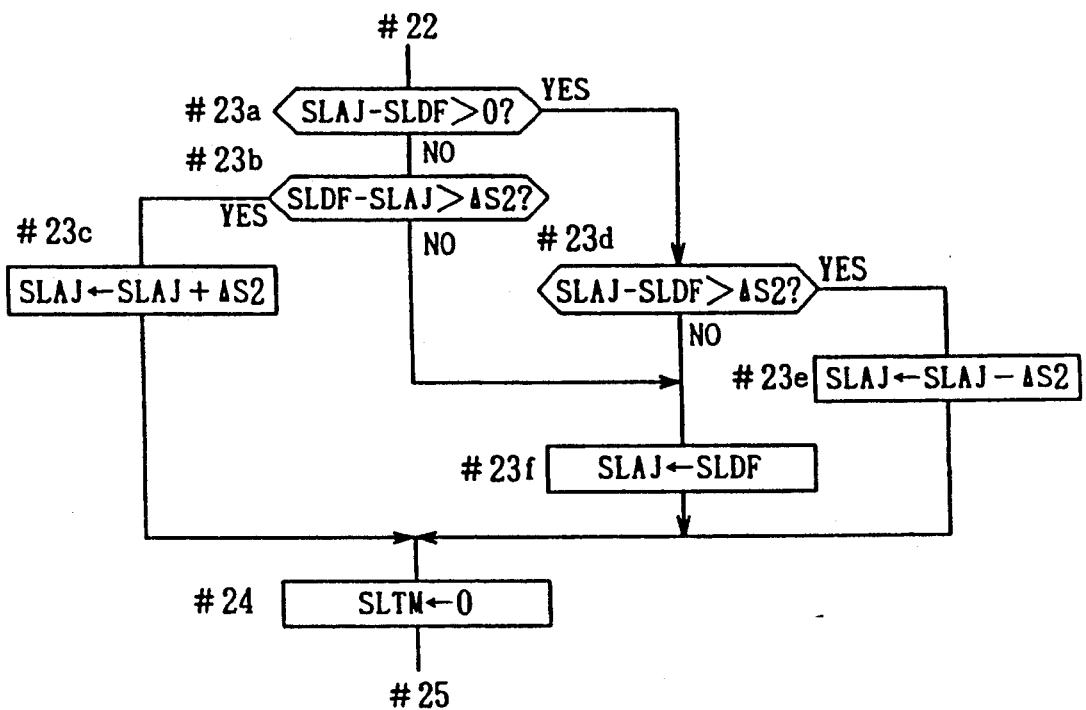

FIG. 10 is a flow chart for an alternative sequence of steps to calculate the slip ratio correction value SLAJ wherein Steps #23a-#23f may be substituted for Step #23 in FIG. 4a. At Step #23a the slip ratio correction value SLAJ obtained in the previous cycle is compared with the slip ratio difference filter value SLDF obtained in the current cycle. If the former is greater than the latter, the procedure advances to Step #23d where it is determined whether the difference therebetween, i.e., SLAJ −SLDF, is greater than a predetermined value ΔS2. If at Step #23d the difference is greater, the procedure advances to Step #23e and the value equal to the previous slip ratio correction value SLAJ minus the predetermined value ΔS2 is set as the current slip ratio correction value SLAJ. However, if at Step #23d the difference is less, the current slip ratio difference filter value SLDF is set as the slip ratio correction value SLAJ.

However, if at Step #23a the previous slip ratio difference filter value SLDF is determined to be greater than the current slip ratio correction value SLAJ, the procedure advances to Step #23b where it is determined whether the difference SLDF−SLAJ is greater than a predetermined value ΔS2. If this difference is greater, the procedure advances to Step #23c and the current slip ratio correction value SLAJ is set as the value equal to the previous slip ratio correction value SLAJ plus the predetermined value ΔS2. If this difference SLDF−SLAJ is less than the predetermined value ΔS2, the procedure advances to Step #23f and the current slip ratio difference filter value SLDF is set as the slip ratio correction value SLAJ.

Figure 11:
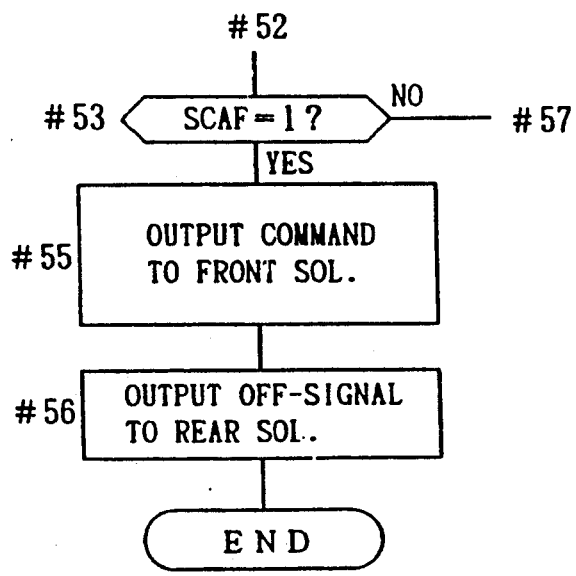

FIG. 11 shows an alternative version of the flow chart in FIG. 6. If after advancing from Step #52 to Step #53 it is determined that the alarm flag SCAF is set, the procedure advances to Step #55 where a command determined by a control algorithm is output to the front solenoid. Then, at Step #56 a pressurize (OFF)

signal is output to the rear solenoid Thus, Steps #55 and #56 are programmed to block antilock brake control of the rear wheel.

The operation of the slip ratio correction apparatus according to the present invention is described hereinbelow with reference to FIGS. 12, 13, and 14.

If the brakes are applied to either the front or the rear brake, the procedure advances to Step #26 from either Step #13 or #14. The current rear wheel slip ratio SLRR is thus corrected using the slip ratio correction value SLAJ obtained in the current cycle and the rear wheel speed VAWR is then corrected at Step #27. If neither the front nor the rear brake is applied, the procedure advances to Step #15 and the slip ratio difference filter value SLDF is calculated. If it is then determined that the acceleration of the estimated vehicle speed is within a predetermined speed range (Step #16) and the difference between the front wheel slip ratio SLRF and the rear wheel slip ratio SLRR is within the predetermined range $\Delta S1$, the timer SLTM is incremented by one. If this determination continues for a predetermined period T1, Step #23 is executed after the predetermined period T1 so that a stable slip ratio difference filter value SLDF is set as the slip ratio correction value SLAJ, and the difference of the current rear wheel slip ratio SLRR minus the slip ratio correction value SLAJ is set as the new rear wheel slip ratio SLRR. Therefore, the new rear wheel slip ratio SLRR becomes a value approximately equal to the front wheel slip ratio SLRF, and the slip rates of both the front and rear wheels are determined to be approximately equal.

Therefore, even if the diameters of the front and rear wheels differ, the difference in any apparent slipping of the front and rear wheels caused by the difference in the wheel speed thereof is corrected and the slip ratio of both wheels is recognized to be approximately zero. Furthermore, the rear wheel speed is corrected to the wheel speed obtained if the diameters of the front and rear wheels were the same (Step #27).

FIG. 13 is a waveform diagram for that case in which the slip ratio difference filter value SLDF does not remain stable for a predetermined period Tl. When the difference between the front and rear wheel slip ratios SLRR−SLRF becomes either greater than or less than the maximum and minimum values of the small predetermined range $\Delta S1$ before the timer SLTM reaches the predetermined period T1, Steps #18 and #19 are executed, thus resetting the timer SLTM and setting a new slip ratio reference value SREF. Then, if the front and rear wheel slip ratio difference SLRR SLRF continues at a stable level for the predetermined period T1 within the small range of change $\Delta S1$ plus or minus this new slip ratio reference value SREF, the slip ratio correction value SLAJ is updated (Step #23). The rear wheel slip ratio SLRR and rear wheel speed VAWR are corrected using the updated slip ratio correction value SLAJ.

FIG. 14 is a waveform diagram describing the operation of the alternative embodiment shown in FIG. 10. This embodiment is comprised to apply correction in stages if the corrected value is high after the slip ratio correction value SLAJ is updated using the new slip ratio difference filter value SLDF. For example, if the current slip ratio difference is significantly smaller than the previous slip ratio correction value SLAJ, the control sequence is programmed to advance from Step #23a to Step #23d and then to #23e to restrict the change in the slip ratio correction value SLAJ to the maximum $\Delta S2$.

As is clear from the above, a slip ratio correction apparatus for motorcycles according to the present invention monitors the difference in wheel slip ratios for a predetermined period, when the brakes are not applied and when a difference is detected in the slip ratios of the front and rear wheels. The apparatus then determines that the difference in the slip ratios is a product of a difference in tire diameter and not of any actual slipping of the tires if the difference in the slip ratios remains roughly constant during this period. The apparatus thus corrects the value of the greater slip ratio to the value of the lesser slip ratio and prevents unnecessary operation of the antilock brake control system due to falsely apparent slipping.

Furthermore, it is also possible to obtain an estimated vehicle speed that is closer to the actual vehicle speed due to correction of the slip ratio.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wheel slip ratio correction apparatus for motorcycles comprising:
   slip ratio difference detection means for obtaining a slip ratio of each wheel when brakes are not applied to one of a front wheel and a rear wheel where the slip ratio is defined as $$\text{slip ratio} = \frac{\text{estimated vehicle speed} - \text{wheel speed}}{\text{estimated vehicle speed}},$$

said slip ratio difference detection means further obtaining a slip ratio difference between a front wheel slip ratio and a rear wheel slip ratio;
   slip ratio difference monitoring means for monitoring a change with time in the slip ratio difference by detecting if the slip ratio difference is stable for a predetermined period of time and is within a predetermined range of change;
   correction value setting means for setting a correction value dependent upon the slip ratio difference; and
   slip ratio correction means for subtracting the correction value from the greater of the front wheel slip ratio and rear wheel slip ratio to eliminate any difference between the front and rear wheel slip ratios when it is detected by said slip ratio difference monitoring means that the change in the slip ratio difference is stable for said predetermined period of time and is within said predetermined range of change.

2. The apparatus according to claim 1, wherein said slip ratio difference monitoring means comprises:
   filter means for filtering the slip ratio difference and outputting a filtered slip ratio difference value;
   reference value setting means for sampling the filtered value to set a reference value; and
   timer means for advancing, in order to monitor a change in time of the filtered value, a counter value if the filtered value is within said predetermined range of change of which a mean value is said reference value, said timer means resetting the counter value if the filtered value is outside said range of change whereby a new reference value is set by sampling the filtered value simultaneously to timer resetting.

3. The apparatus according to claim 2, wherein said slip ratio difference monitoring means further comprises:
means for calculating an estimated vehicle speed;
means for calculating an amount of change in the estimated vehicle speed; and
means for detecting whether said amount of change is within a predetermined range of change,
whereby a new reference value is set by sampling the filtered value simultaneously to timer resetting if said amount of change is not within the predetermined range of change.

4. The apparatus according to claim 3, wherein said predetermined range of change is provided as a function of the estimated vehicle speed.

5. The apparatus according to claim 1, wherein said predetermined period of time is determined dependent upon the estimated vehicle speed.

6. The apparatus according to claim 1, wherein said slip ratio correction means subtracts the correction value from the rear wheel slip ratio so that the rear wheel slip ratio is approximately equal to the front wheel slip ratio.

7. The apparatus according to claim 2, wherein said correction value setting means defines the filtered value of the slip ratio difference as the correction value.

8. The apparatus according to claim 7, wherein said correction value setting means comprises:
means for determining if a difference between a currently set correction value and the filtered value of the most recent slip ratio difference is within a predetermined range; and
means for setting the filtered value of the slip ratio difference as a new correction value if the difference is within said predetermined range, and for setting a value equal to the predetermined range plus the currently set correction value as a new correction value if the difference is not within said predetermined range.

9. The apparatus according to claim 2, further comprising alarm means for producing a warning signal when said reference value exceeds a predetermined allowance range.

10. The apparatus according to claim 9, wherein said alarm means comprises a warning lamp which lights steady when the warning signal is being output.

11. The apparatus according to claim 10, wherein said alarm means comprises blocking means for blocking the operation of an antilock brake system when the warning signal is being output.

12. The apparatus according to claim 10, wherein said alarm means comprises blocking means for blocking the operation of an antilock brake system for the rear wheel when the warning signal is being output.

13. The apparatus according to claim 1, further comprising alarm means for producing a warning signal when said correction value exceeds a predetermined allowance range.

14. The apparatus according to claim 13, wherein said alarm means comprises a warning lamp which lights steady when the warning signal is being output.

15. The apparatus according to claim 14, wherein said alarm means comprises blocking means for blocking the operation of an antilock brake system when the warning signal is being output.

16. The apparatus according to claim 14, wherein said alarm means comprises blocking means for blocking the operation of an antilock brake system for the rear wheel when the warning signal is being output.

17. The apparatus according to claim 1, further comprising means for calculating said wheel speed in response to signals output from an interface, the output signals being defined as a function of the rotational speed of the front and rear wheels; and
means for obtaining the slip ratio in response to the signals output from said interface in accordance with a determined ON or OFF state of a front wheel brake switch and a rear wheel brake switch.

18. The apparatus according to claim 1, said motorcycle comprising a front wheel brake switch and a rear wheel brake switch, each of the switches having an ON and OFF state;
said apparatus further comprising means for enabling said slip ratio difference detection means to obtain a slip ratio of each wheel when the brake switches are in an OFF state.

19. A system comprising a wheel slip ratio correction apparatus for correcting a wheel slip ratio in a mobile vehicle, said mobile vehicle comprising at least a front and a rear wheel and braking means for applying a braking force to each of the wheels, said apparatus comprising:
means for estimating the speed of movement of said mobile vehicle;
means for measuring the wheel speed of each wheel;
slip ratio difference detection means comprising means for obtaining a slip ratio of at least said front wheel and said rear wheel of said mobile vehicle, and means for determining a slip ratio difference by determining the difference between the slip ratio of said front wheel and the slip ratio of said rear wheel;
means for monitoring said slip ratio difference, said monitoring means comprising means for detecting if (i) deviations in the slip ratio difference remain below a predetermined maximum amount and (ii) said slip ratio difference remains within a predetermined range of a predetermined time period;
means for setting a correction value as a function of the slip ratio difference; and
means for correcting the slip ratio comprising means for subtracting the correction value from the greater of the front wheel slip ratio and the rear wheel slip ratio when said monitoring means detects that deviations in the slip ratio difference remain below a predetermined maximum amount for a predetermined time period and said slip ratio difference is within a predetermined range.

20. The system according to claim 19, wherein said vehicle comprises a motorcycle.

21. The system according to claim 19, wherein said slip ratio comprises a value which is proportional to $$\frac{\text{the estimated vehicle speed} - \text{wheel speed}}{\text{the estimated vehicle speed}}.$$

22. The system according to claim 19, wherein said system comprises an automatic braking system.

23. The system according to claim 19, wherein said wheel speed measuring means comprises a rotational speed sensor which outputs a signal proportional to the tangential velocity of the wheel.

24. The system according to claim 23, wherein said wheel speed measuring means comprises a rotational speed sensor corresponding to each wheel, which outputs a signal proportional to the tangential velocity of the wheel.

25. The system according to claim 24, wherein the vehicle sped estimation means comprises at least one of the rotational speed sensors.

26. The system according to claim 19, wherein said slip ratio difference detection means are operative when said brakes are not applied to at least one of said first wheel and said second wheel.

27. The system according to claim 26, wherein said slip ratio difference detection means are operative when said brakes are not applied to said front and said rear wheel.

28. The system according to claim 19, wherein said system comprises an anitlock brake control system.

29. The system according to claim 28, wherein said mobile vehicle comprises a motorcycle.

30. The system according to claim 19, further comprises means for controlling the braking force applied to respective wheels.

31. The system according to claim 30, wherein said controlling means comprises front and rear wheel actuators each comprising a solenoid.

32. The system according to claim 30, wherein said controlling means comprises means for determining the braking force which should be applied to each wheel, as a function of the corrected slip ratio.

33. The system according to claim 32, wherein said system comprises an antilock brake control system, and wherein said mobile vehicle comprises a motorcycle.

* * * * *

UNITED STATES PATENT AND TRADEMARK OFFICE
CERTIFICATE OF CORRECTION

PATENT NO. : 5,246,278
DATED : September 21, 1993
INVENTOR(S) : M. YOSHINO et al.

It is certified that error appears in the above-indentified patent and that said Letters Patent is hereby corrected as shown below:

At column 2, line 23, insert ---by--- after "executed".

At column 2, line 36, change "CAL" to ---CAL.---.

At column 3, line 50, delete "20".

At column 5, line 27, delete "trast,".

At column 7, line 50, change "SLRR SLRF" to ---SLRR - SLRF---.

At column 10, line 45 (claim 19, line 22), change "of" to ---for---.

At column 11, line 9 (claim 25, line 2), change "sped" to ---speed---.

Signed and Sealed this

Tenth Day of September, 1996

*Attest:*

BRUCE LEHMAN

*Attesting Officer*     Commissioner of Patents and Trademarks